(12) United States Patent
Newton

(10) Patent No.: US 12,169,755 B2
(45) Date of Patent: Dec. 17, 2024

(54) ASSET TRACKING SYSTEM AND METHOD

(71) Applicant: Robert C Newton, Moseley, VA (US)

(72) Inventor: Robert C Newton, Moseley, VA (US)

(*) Notice: Subject to any disclaimer, the term of this patent is extended or adjusted under 35 U.S.C. 154(b) by 196 days.

(21) Appl. No.: 18/081,440

(22) Filed: Dec. 14, 2022

(65) Prior Publication Data
US 2023/0109754 A1    Apr. 13, 2023

Related U.S. Application Data

(63) Continuation-in-part of application No. 16/459,975, filed on Jul. 2, 2019, now Pat. No. 11,531,106.

(60) Provisional application No. 62/696,074, filed on Jul. 10, 2018.

(51) Int. Cl.
G06K 7/10    (2006.01)

(52) U.S. Cl.
CPC ............... G06K 7/10475 (2013.01)

(58) Field of Classification Search
CPC .................................... G06K 7/10475
See application file for complete search history.

(56) References Cited

U.S. PATENT DOCUMENTS

2008/0231446 A1*  9/2008  Cresto ............... G06Q 10/087
                                                340/572.1
2012/0239493 A1*  9/2012  Zughaib .............. G06Q 10/08
                                                705/14.49

* cited by examiner

*Primary Examiner* — Girumsew Wendmagegn
(74) *Attorney, Agent, or Firm* — Woods Rogers PLC; Timothy Bechen

(57) ABSTRACT

A method and system provides for determining position information for tracking tags relative to a plurality of tracking stations. The method and system includes initiating a wake cycle at a first time including pausing for a first time period and thereafter emitting a blast of light in a light sweep. The method and system includes the tracking tags waking at the first time and activating a photoreceptor embedded therein. The tracking tags detecting the blast of light and initiating a tracking timer therein. From there, the method and system includes the tracking stations emitting a vertical laser in a circular rotation at a rotational speed. Whereby, the tracking tags detect the vertical laser at a timestamp and detect an angle between the tracking tag tracking stations based thereon.

20 Claims, 15 Drawing Sheets

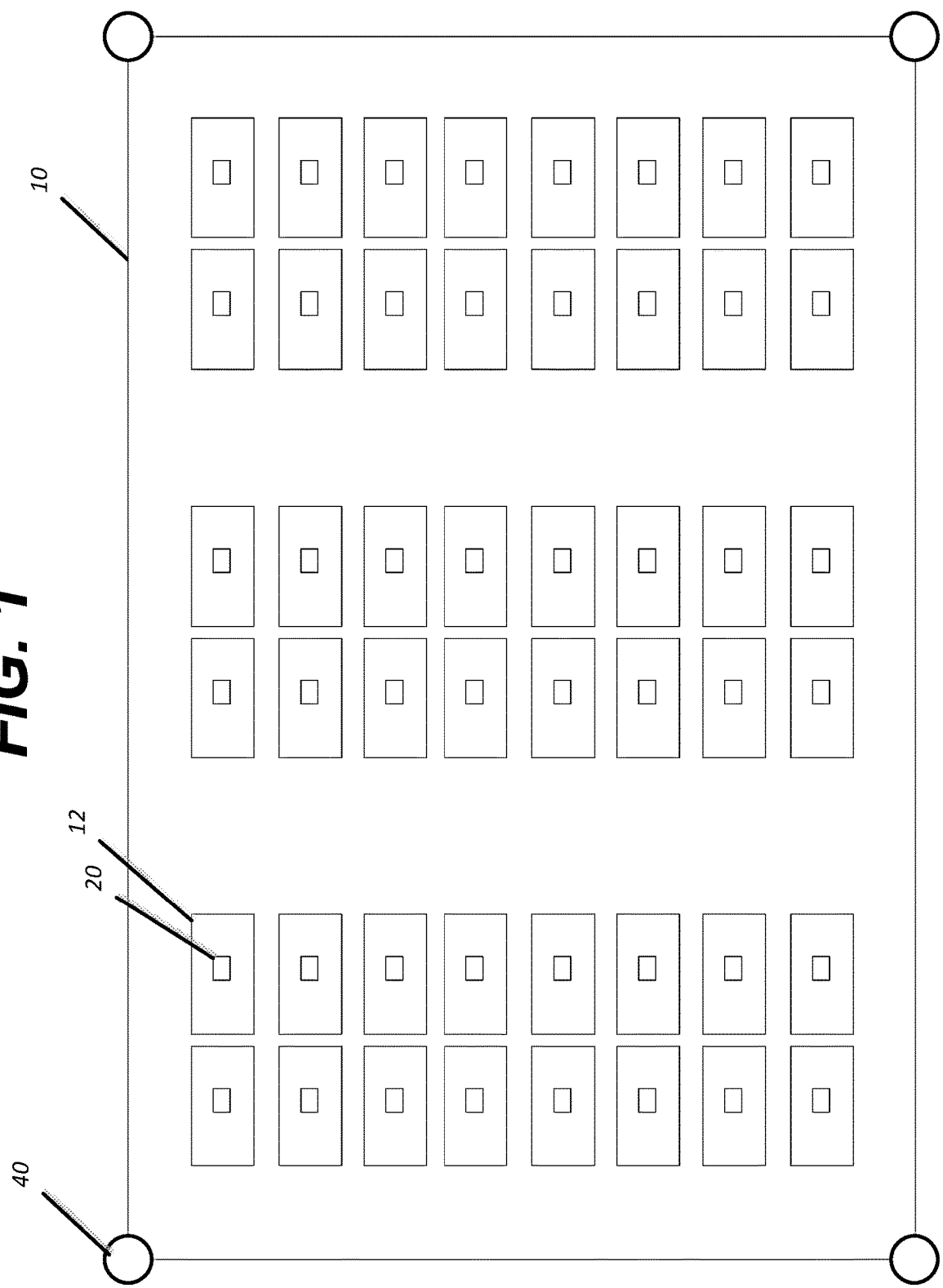

ASSET TRACKING SYSTEM AND METHOD

RELATED APPLICATIONS

This application is a continuation-in-part of and claims priority to U.S. patent application Ser. No. 16/459,975 filed Jul. 2, 2019, U.S. Pat. No. 11,531,106, entitled "ASSET TRACKING SYSTEM AND METHOD", which claims priority to U.S. Provisional Application Ser. No. 62/696,074, filed Jul. 10, 2018, the contents of which are incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present invention relates to systems and methods for identifying two-dimensional locations of physical assets.

Many different types of businesses have many different types of physical assets that need to be tracked. That is, a business may need to be able to readily determine a current location of a specific physical asset. As an example, large motor vehicle dealerships may have dozens or even hundreds of motor vehicle (cars, trucks, etc.) parked in one or more parking lots at its business location. On any given day, many of the vehicles are test-driven, serviced (washed, etc.), transferred to a different facility, etc. As such, an employee often needs to be able to quickly determine the location of a specific vehicle. Also, after a vehicle is test-driven, etc. it is often returned to a different parking spot in the same lot or even a different lot. Thus, a vehicle's location may change many times over the course of a day.

What is needed is a quick and reliable means of identifying the location of many different assets in real-time (or near real-time).

BRIEF SUMMARY OF THE DISCLOSURE

Embodiments of the invention comprise a system for identifying a location of one or more assets in a predefined two-dimensional (2-D) area. In one embodiment, tracking stations perform initialization or wake-up routine operations, whereby tracking tags synchronize with the wake-up routines, as well as detect angle from various tracking stations. By detecting these angles, the tracking tags can then identify their locations within the 2-D area.

This method and system includes each of the tracking stations initiating a wake cycle at a first time including pausing for a first time period. After the first time period, each of the tracking stations emit a blast of light in a light sweep. The tracking tags are programmed to wake at the first time, as well as activate a photoreceptor included in the tracking tag.

Based on the photoreceptor, each of tracking tags detecting the blast of light originating from the tracking station and initiating a tracking timer therein. After emitting the blast of light, the tracking station therein emits a vertical laser in a circular rotation at a known or defined rotational speed.

Thus, each tracking tag is able to detect the vertical laser and apply a timestamp of the detection. Based on this timestamp and knowing the rotational speed of the tracking station, the tracking tag is able to determine the angle between the tracking tag and the tracking station.

The process is repeated for each of the tracking stations. For each tracking station, it emits a unique vertical laser in a circular rotation. Therein, the tracking tags are able to determine angles for each of the tracking stations. Having knowledge of the angles, computer processing routines are usable to determine the location of the tracking tag within the 2-D area.

In one embodiment, the detecting of the angle is based on subtracting a start time of the tracking timer from the timestamp. Moreover, detecting the angle is further based on the rotational speed of the tracking station emitting the vertical laser.

In further embodiment, operative concurrent with or in lieu of the above embodiments, the system comprises at least three tracking stations and one or more tracking tags. Each tracking station has a different known location in 2-D space. Each tracking station is configured to selectively emit a vertical laser line upon which is embedded an identifier unique to the corresponding tracking station. Each tracking station is configured to selectively sweep its laser line about a central axis of the corresponding tracking station such that each tracking station's laser line sweeps across at least a portion of the predefined 2-D area. Each tracking station is configured to selectively transmit a current angle of its laser line about its central axis as its laser line sweeps about its central axis. Each tracking tag is attachable to an asset whose location in the predefined 2-D area is to be selectively identified. Each tracking tag is configured to detect a laser line from at least three tracking stations within a line of sight of the tracking tag. Each tracking tag is configured to decode the unique tracking station identifier from each detected laser line. Each tracking tag is configured to receive the current angle from the tracking station corresponding to the detected laser line. Each tracking tag is configured to store the decoded unique tracking station identifier from each detected laser line and to store the received current angle.

Each tracking station may be configured to selectively sweep its laser line 360 degrees about its central axis.

Each tracking station may be configured to selectively transmit the current angle of its laser line about its central axis relative to magnetic north.

Each tracking station may be configured to selectively transmit the current angle of its laser line about its central axis by embedding the angle in the vertical laser line or by transmitting the angle via radio frequency.

Each tracking station may be configured to selectively transmit the current angle of its laser line about its central axis every one-tenth of a degree.

Each tracking station comprises a drum that is selectively rotatable about its central axis to sweep its laser line. Each drum may have an angled mirror and a laser line generator lens. Each tracking station may have an infrared (IR) laser configured to emit IR laser light vertically at the corresponding angled mirror. The angled mirror of each tracking station may be configured to reflect the IR laser light at the corresponding laser line generator lens such that the IR laser light is vertically spread and emitted outward from the corresponding tracking station.

Each tracking tag may comprise one or more IR receivers. Each IR receiver may comprise an IR photodiode.

The system may further comprise a computing device in communication with one or more of the tracking stations and/or one or more of the tracking tags. Each tracking tag may selectively transmit its stored unique tracking station identifier from each detected laser line and stored current angle to the computing device. The computing device may be configured to calculate a current location of each tracking tag based on the received unique tracking station identifier and current angle from each tracking tag and based on the known location of each tracking station. Each tracking tag may selectively transmit its stored unique tracking station identifier from each detected laser line and stored current angle to the computing device via an intermediary device. The intermediary device may comprise one of the tracking stations.

In alternative embodiments of the invention, a method for identifying a location of one or more assets in a predefined two-dimensional (2-D) area comprises: (a) selectively emitting a vertical laser line respectively from each of at least three different tracking stations and sweeping the laser line about a central axis of the corresponding tracking station such that each tracking station's laser line sweeps across at least a portion of the predefined 2-D area, wherein each tracking station has a different known location in 2-D space, wherein an identifier unique to each tracking station is embedded in the corresponding vertical laser line; (b) selectively transmitting from each tracking station a current angle of its laser line about its central axis as its laser line sweeps about its central axis; (c) detecting, by each of one or more tracking tags attached, respectively, to each of the one or more assets whose location in the predefined 2-D area is to be selectively identified, a laser line from at least three tracking stations within a line of sight of the respective tracking tag; (d) decoding, by each of one or more tracking tags, the unique tracking station identifier from each detected laser line; (e) receiving, by each of one or more tracking tags, the current angle from the tracking station corresponding to the detected laser line; and (f) storing, by each of one or more tracking tags, the decoded unique tracking station identifier from each detected laser line and to store the received current angle.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 1 is a simplified diagram of a deployed asset tracking system, in accordance with embodiments of the present invention.

DETAILED DESCRIPTION OF THE DISCLOSURE

Figure 2A:
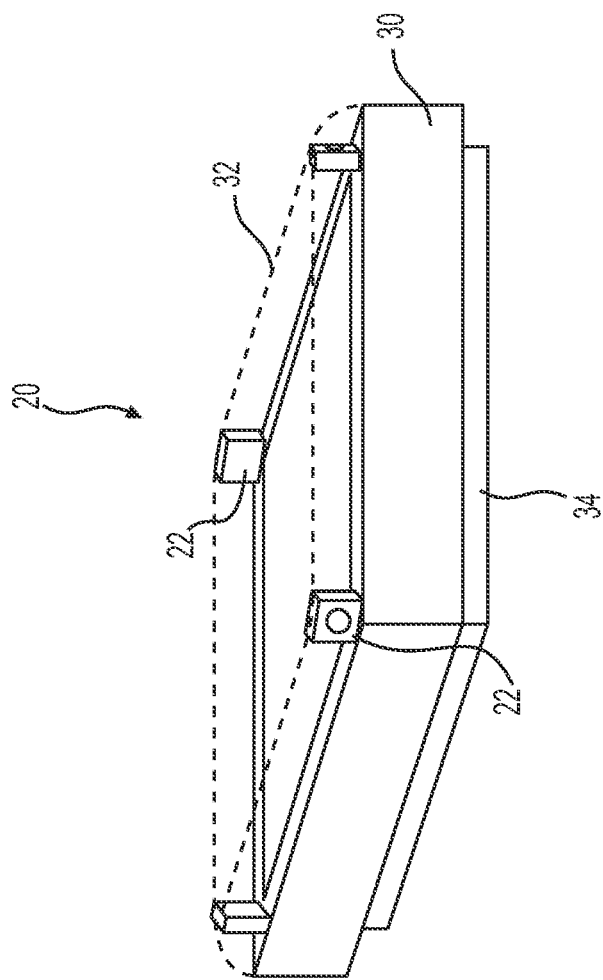
FIGS. 2A-C are perspective views of three different tracking tags of the asset tracking system of FIG. 1.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise a system and method for tracking assets. The system and method of embodiments of the invention may be used to determine a two-dimensional (2-D) location of any suitable asset in any suitable location in which there is a line of sight to each asset from at least three different locations. For example, the system and method of embodiments of the invention may be used to determine the location of each motor vehicle in a parking lot.

The system and method of embodiments of the invention determine and provide the position within a 2-D frame of reference of each of a plurality of tracking tags that are each affixed to a different individual asset. Multiple tracking stations are placed at a high vantage point in multiple positions within and around the tracked area. The tracking stations sweep a vertical laser line horizontally over the tracked area. The angle from magnetic north is provided by each tracking station to each tracking tag at the point when the laser hits the tag (such as by encoding the angle on the laser light or transmitting the angle via radio frequency transmission). Upon receiving the angle from multiple tracking stations over a predetermined brief period of time, the tag wakes a radio transceiver to transmit to a designated master tracking station (or any other suitable device), acting as a gateway to the internet, the collection of angles and their associated station identifiers. An internet connected server (or any other suitable device) receives the transmission of angles and station identifiers for a tag and, along with the known position (latitude and longitude) of each tracking station, calculates the position (latitude and longitude) of the tracking tag. The location (latitude and longitude) of each tracking tag may be provided to one or more users in any suitable format, such as by displaying on a map of the tracked area or converting the latitude and longitude into a more user-friendly reference (for example, row and space number for a parking lot).

Referring now to the figures, a system and method for tracking assets of embodiments of the invention is illustrated. FIG. 1 is a simplified diagram of an asset tracking system of embodiments of the invention deployed for use. The system comprises a plurality of tracking stations 40 (four are shown) positioned around an area 10 in which a plurality of individual assets 12 are to be tracked (specifically, the location of each individual asset can be identified in 2-D space within the tracked area 10). A tracking tag 20 is affixed to each individual asset 12. In one exemplary deployment, the tracked area 10 is a parking lot and the assets to be tracked are motor vehicles or the like (e.g., cars, trucks, trailers, motor homes, etc.). The tracking tags 20 may be permanently or (more likely) removably affixed to each asset, such as via a magnetic mount (or any suitable mounting mechanism). The tracking tags 20 are typically mounted on top of each asset, or in some other position such that each tracking tag is within the line of sight of at least three tracking stations 40, regardless of the location of each asset within the tracked area.

The number and location of tracking stations 40 is selected such that each tracking tag 20 (on its corresponding asset) is within the line of sight of at least three tracking stations 40, regardless of the location of each asset within the tracked area. The tracking stations 40 are preferably mounted in an elevated position to increase the quantity of tracking tags within the line of sight of each tracking station (i.e., so that the line of sight between tracking stations and tracking tags is not blocked by other assets). For example, the tracking stations 40 may be mounted on light poles at a height of about 10-20 feet above the ground. Generally, the more irregularly-shaped the tracked area is the greater quantity of tracking stations will typically be required to fully cover the area. Also, any obstructions (such as trees) within the tracked area will likely increase the quantity of tracking stations required to fully cover the area. While each tracking tag 20 within the tracked area should be within the line of sight of at least three tracking stations 40, it may be desirable to have each tracking tag 20 within the line of sight of more than the minimum quantity of tracking stations 40 (in case of, for example, temporary obstructions or tracking station failure). FIG. 1 shows the tracking stations 40 located on the perimeter of the tracked area 10, but one or more tracking stations could be located in the interior of the tracked area.

Figure 3:
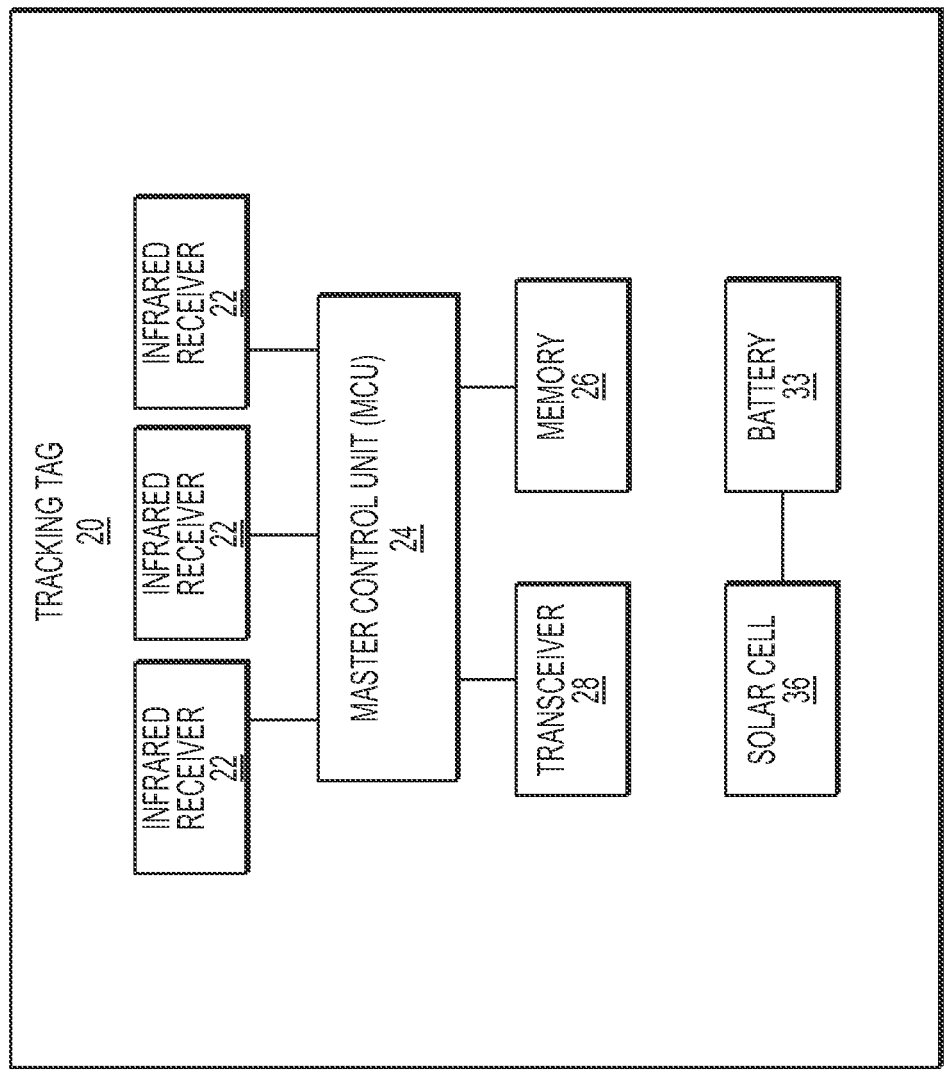
FIG. 3 is a block diagram of the tracking tag of FIG. 2A.
Figure 4:
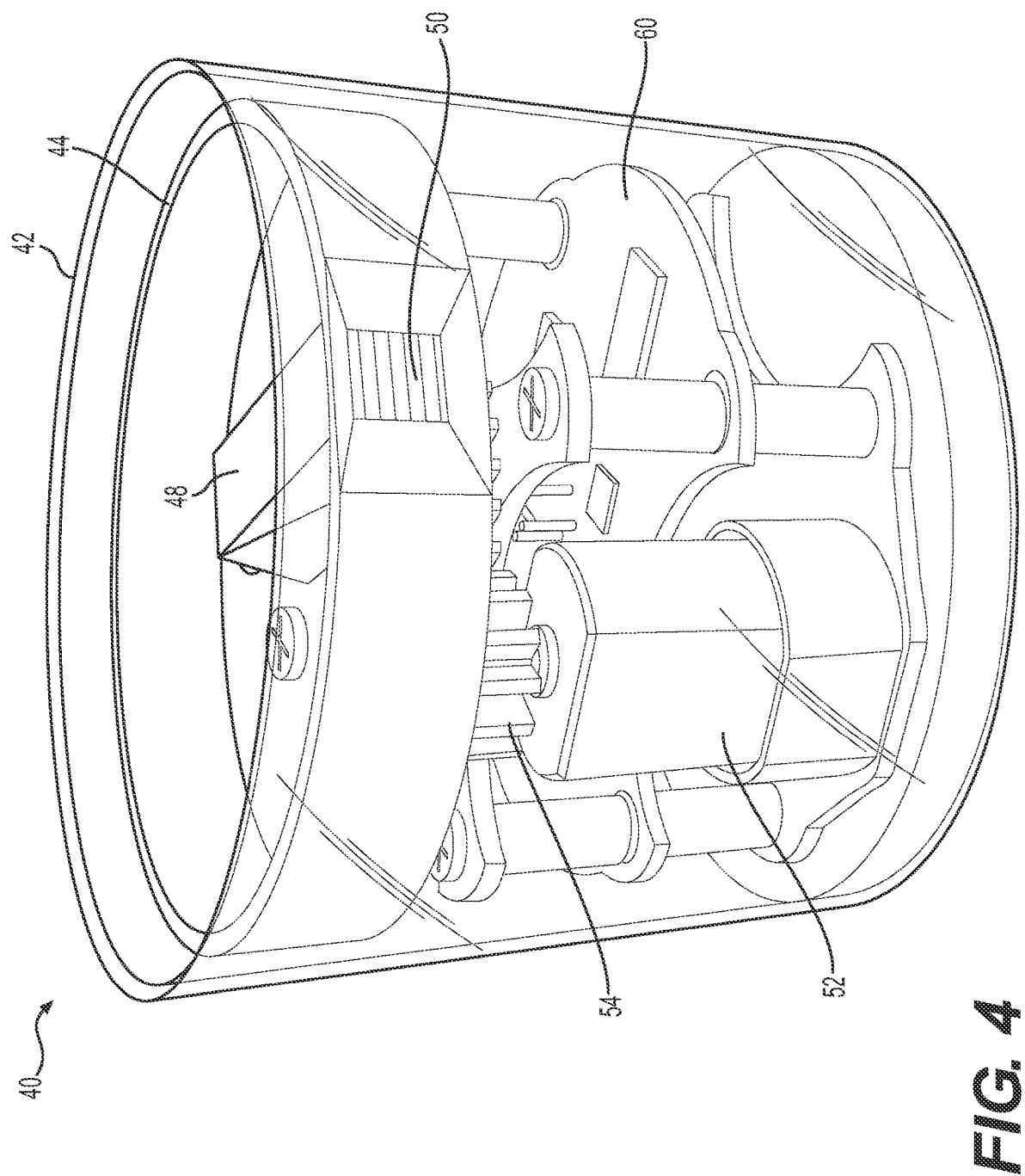
FIG. 4 is a perspective view of a tracking station of the asset tracking system of FIG. 1, with the housing partially transparent for visibility of internal components.

FIG. 2A is a perspective view of a tracking tag 20, and FIG. 3 is a block diagram of the tracking tag of FIG. 2A. Each tracking tag 20 has a housing 30 that encloses the components and provides protection from the weather. Each tracking tag 20 comprises three or more infrared (IR) photodiodes 22 (referred to herein as IR receivers) positioned to capture IR laser light from 360 degrees around the tracking tag 20. (The number of IR receivers in each tracking tag depends on the field of view of the specific IR receivers used. It may be possible to use as few as one IR receiver in each tracking tag, if such a single IR receiver has a 360 degree field of view.) The tracking tag 20 is able to detect a laser line emitted from each of a plurality of tracking stations 40 (described further below) with the 360 degree field of view that enables the tracking tag 20 to receive the laser transmission from any horizontal direction. At least part of the housing should be constructed of a material that is a visible light filter allowing only a specific infrared (IR) wavelength through and blocking most visible light to enable IR laser light from the tracking stations to reach the IR receivers 22. FIG. 2A illustrates a top cover 32 in dashed line to indicate it is constructed of such a material. Each tracking tag 20 will have some mechanism for attaching the tracking tag 20 to its corresponding asset, such as magnetic mount 34. Each tracking tag 20 further comprises a master control unit (MCU) 24, a memory 26, and a radio transceiver 28. The MCU 24 may comprise a microprocessor, dedicated or general purpose circuitry (such as an application-specific integrated circuit or a field-programmable gate array), a suitably programmed computing device, or any other suitable means for controlling the operation of the tracking tag 20. Each tracking tag 20 further comprises a power source, such as one or more batteries 33 (which may be rechargeable), and may further comprise a solar panel 36 to power the tracking tag 20 and/or recharge the batteries 33.

Figure 2B:
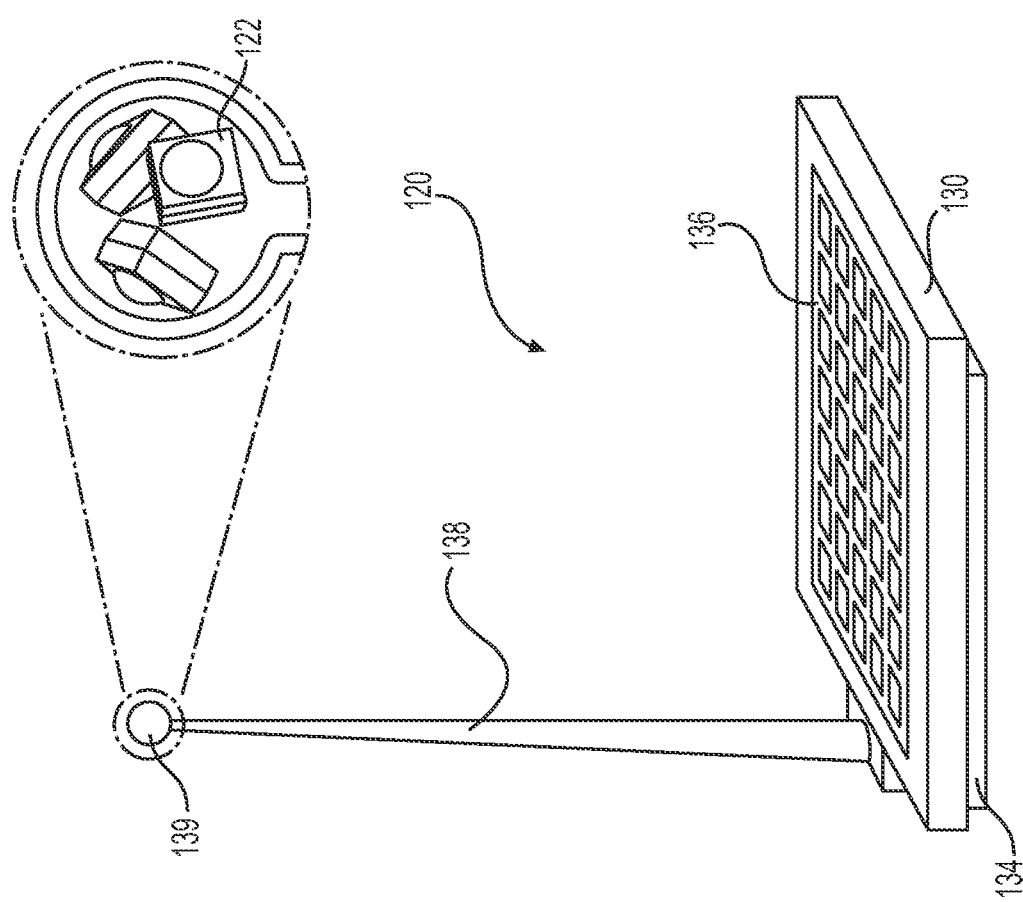

FIG. 2B is a perspective view of an alternative tracking tag 120. The tracking tag 120 comprises a housing 130 that encloses the components described above, a mechanism for attaching the tracking tag 120 to its corresponding asset (such as magnetic mount 134), an optional solar panel 136, and IR receivers 122 mounted within a small spherical housing 139 at the top of a mast 138. The spherical housing 139 is constructed of a similar material as the cover 32 of FIG. 2A. The mast 138 is helpful to raise the IR receivers 122 to a height at which they are less likely to be blocked by roof-mounted accessories (roof racks, etc.) or snow. Thus, the mast 138 may be any suitable height, but typically about 8-12 inches in height.

Figure 2C:
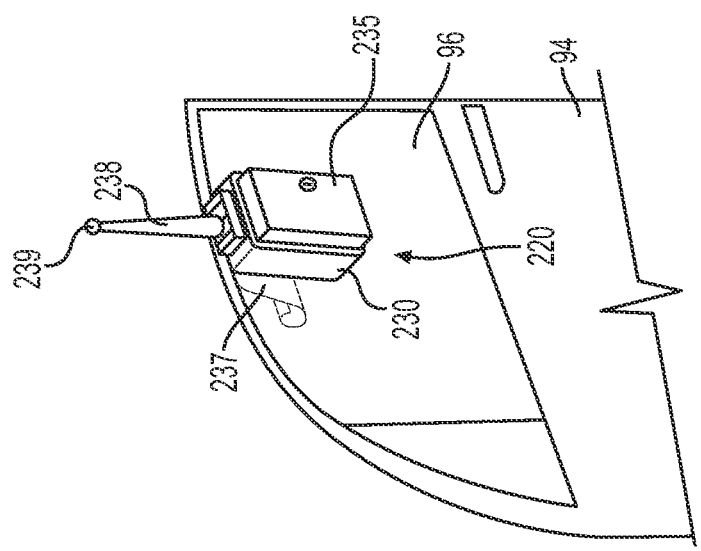

FIG. 2C is a perspective view of an alternative tracking tag 220. The tracking tag 220 comprises a housing 230 that encloses the components described above, a clip 237 or the like for attaching the tracking tag 220 to a vehicle window 96 (on vehicle door 94), and IR receivers (not illustrated) mounted within a small spherical housing 239 at the top of a mast 238. The spherical housing 239 is constructed of a similar material as the cover 32 of FIG. 2A. The mast 238 is helpful to raise the IR receivers above the roof of the vehicle (and maybe any roof-mounted accessories (roof racks, etc.)). Thus, the mast 238 may be any suitable height, but typically about 8-12 inches in height. The tracking tag 220 includes an optional lockbox 235 which may be used to store the vehicle's keys, or may be mounted to an existing window mounted lockbox (not illustrated) intended to store keys to the vehicle.

FIGS. 4-9 illustrate details of a tracking station 40, in accordance with embodiments of the invention. Each tracking station 40 has a rotating component (described further below) which emits a thin vertically-fanned laser line in the infrared spectrum from an IR laser 58. This laser line is pulse width modulated to encode on it the tracking station's unique identifier (any suitable technique may be used to encode the identifier on the laser line). The angle of the laser line relative to magnetic north may also be encoded (such as via pulse width modulation or any suitable technique) onto the laser line, or alternatively the angle of the laser line may be transmitted by the tracking station via radio frequency (RF). The tracking station 40 may also contain a master control unit (MCU) 80, a memory 82, a radio transceiver 84 for sending and receiving radio transmissions to/from the tracking tags 20, a GPS receiver 86 to record the station's current position on earth, a magnetic sensor 88 to determine the angle to magnetic north, and a WIFI radio 90 for connecting to the internet through a wireless access point for the purposes of acting as an internet gateway for tracking tag transmissions to the server. Each tracking station 40 further comprises a power source (not illustrated), such as one or more batteries (which may be rechargeable), a solar panel, or an AC power source. The MCU 80 may comprise a microprocessor, dedicated or general purpose circuitry (such as an application-specific integrated circuit or a field-programmable gate array), a suitably programmed computing device, or any other suitable means for controlling the operation of the tracking station 80.

As seen in FIGS. 4-9, the tracking station 40 has a generally cylindrical housing 42 that encloses the components and provides protection from the weather (while the cylindrical shape may not be strictly necessary, it is typically preferred due to the rotating component housed within). A rotating drum 44 is selectively rotatable to emit a thin vertically-fanned laser line that sweeps 360 degrees as the drum 44 rotates (described further below). An electric motor 52 is selectively activated to selectively rotate the drum 44. Any suitable type of motor may be used, such as a brushless DC hard drive motor. The motor will typically spin at a low rotational speed to produce the desired low rotational speed of the rotating drum. The rotational speed of the drum 44 should be slow enough to allow the laser light to impinge on the IR receivers 22 long enough to decode the data encoded on the laser light, but fast enough to preserve the battery life of the tracking tags (by minimizing the amount of time the tracking tags must be "awake"). In one exemplary embodiment of the invention, the drum 44 rotates at about 30 RPM.

Figure 5:
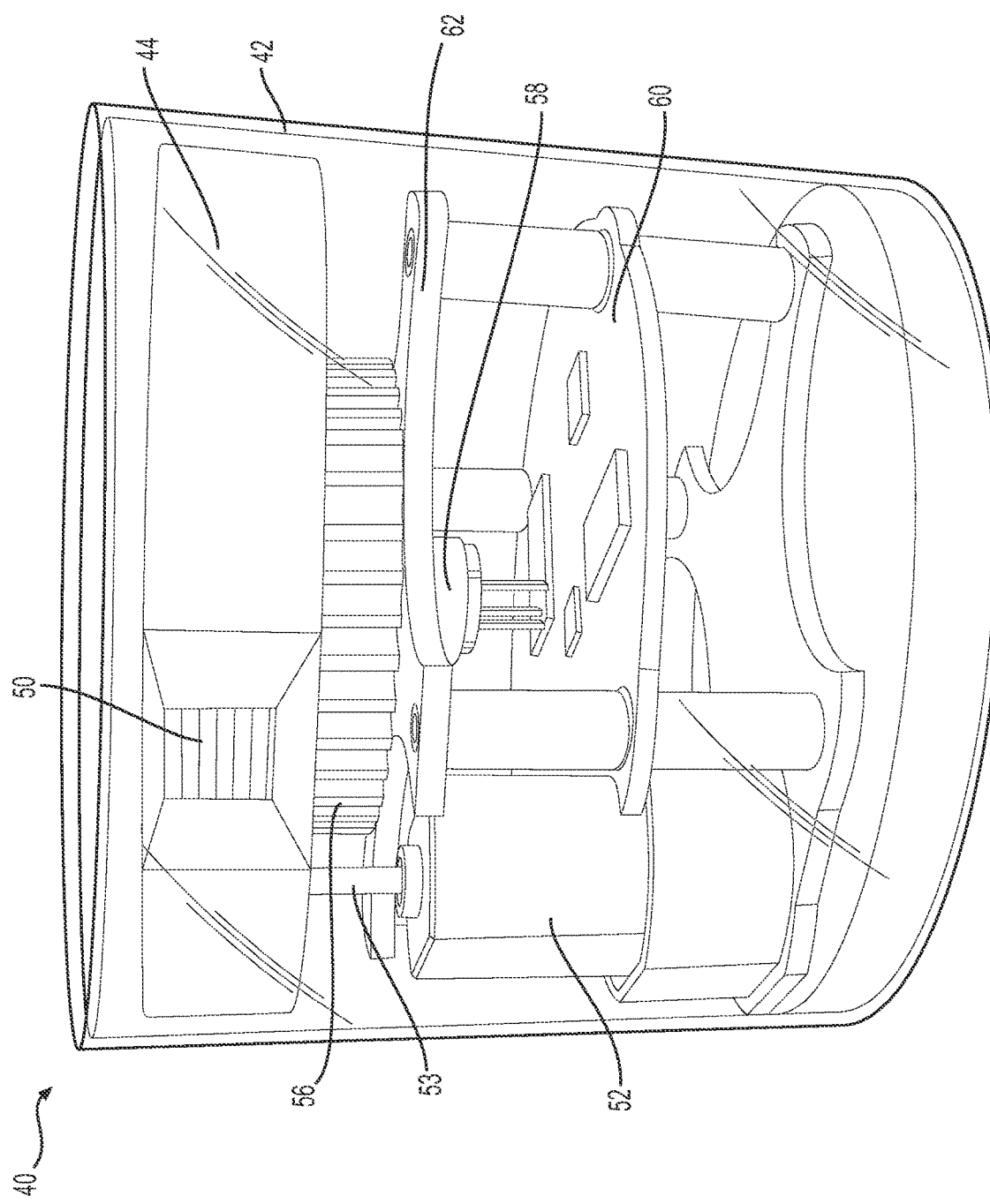
FIG. 5 is a front view of the tracking station of FIG. 4.
Figure 6:
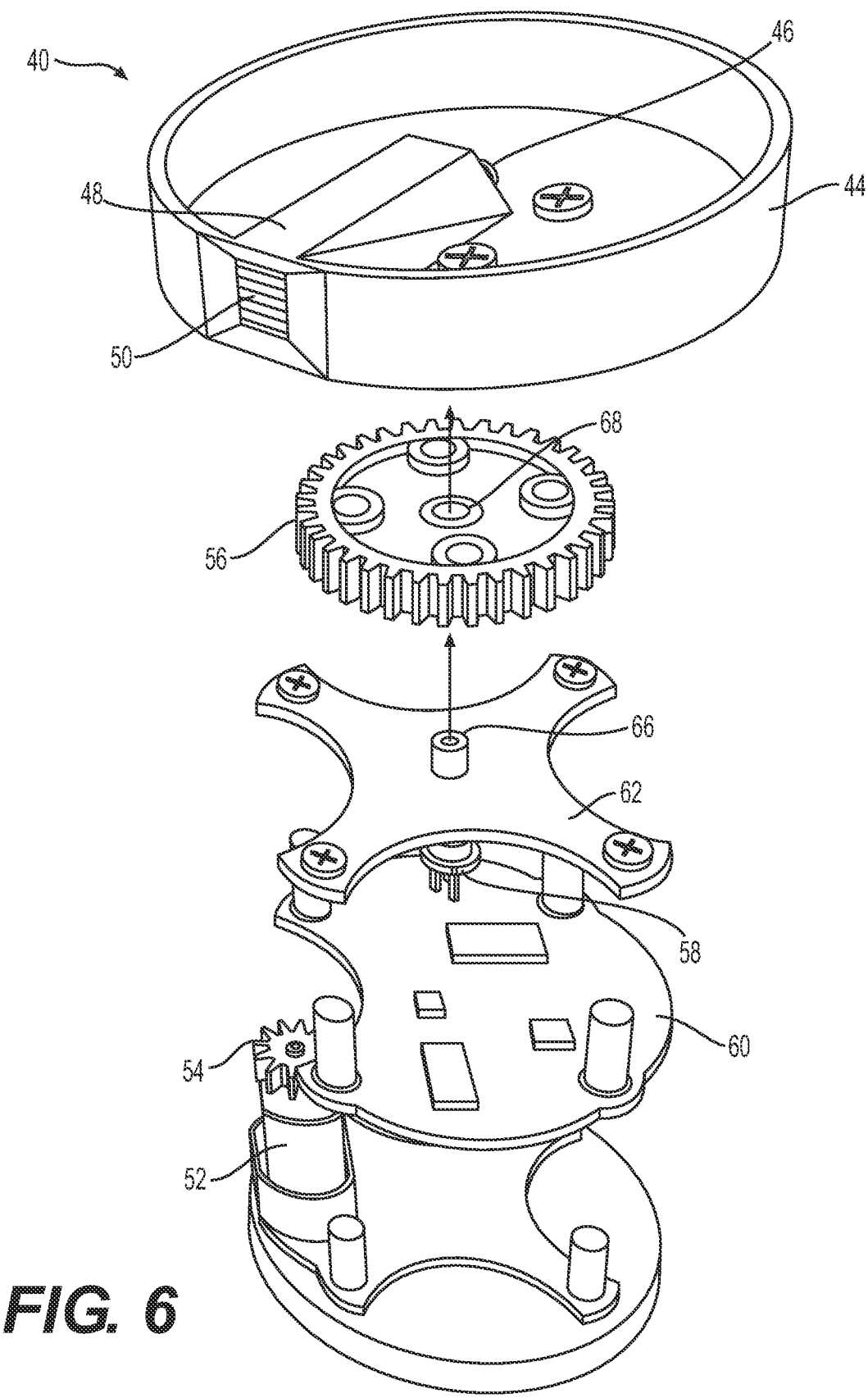
FIGS. 6 and 7 are exploded perspective views of the tracking station of FIG. 4.
Figure 7:
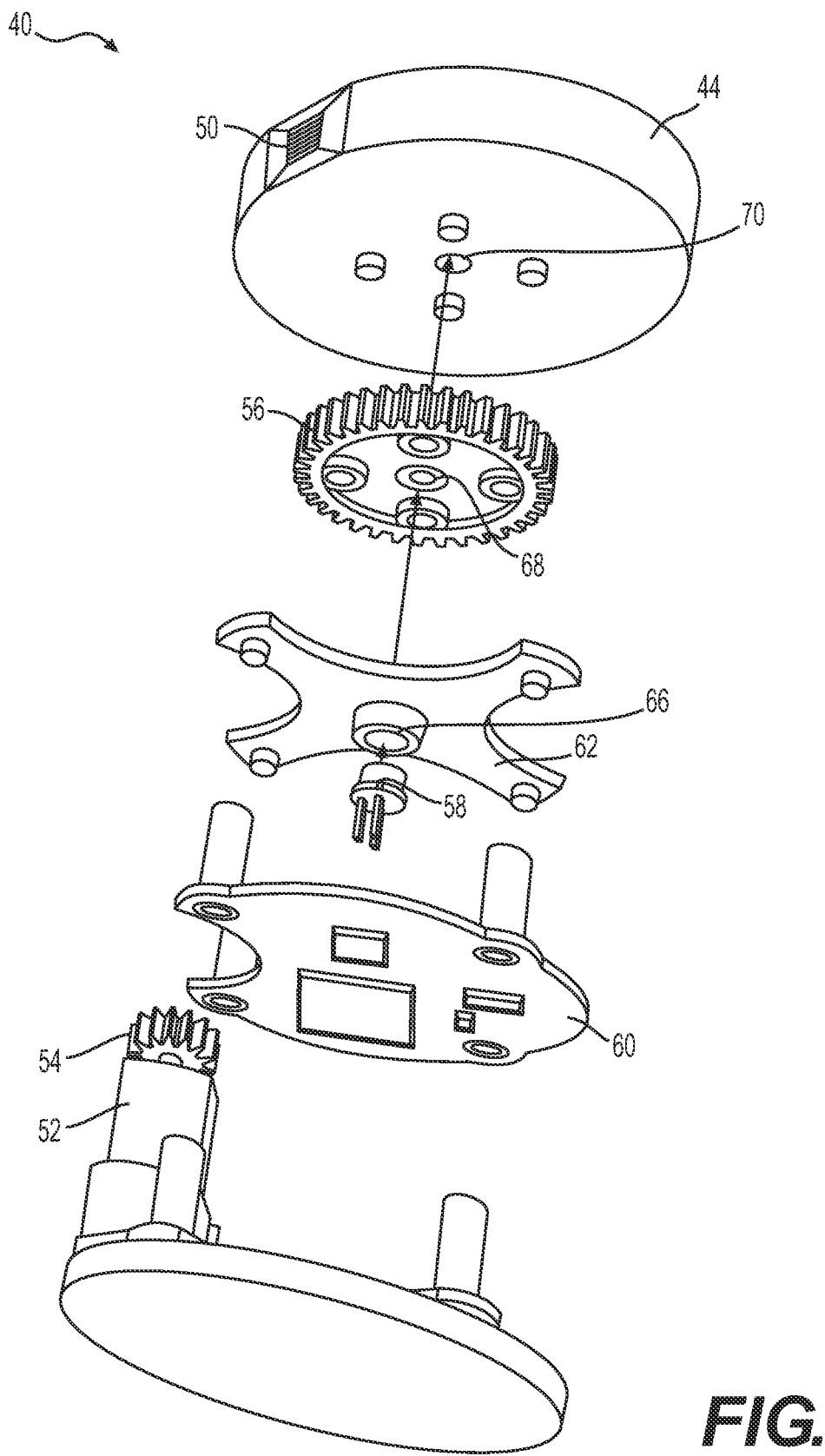
Figure 8:
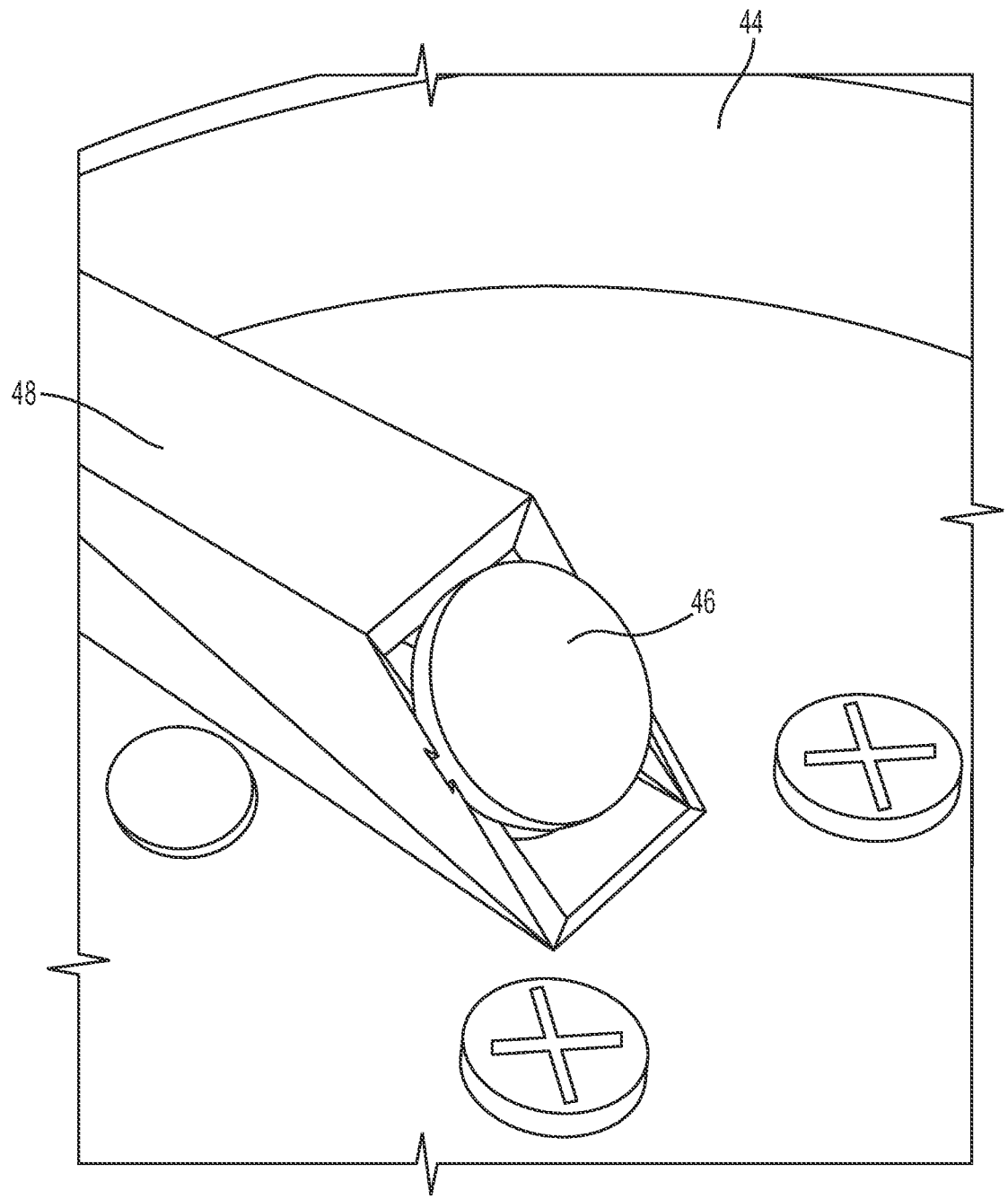
FIG. 8 is a close-up perspective view of the top of the tracking station of FIG. 4.
Figure 9:
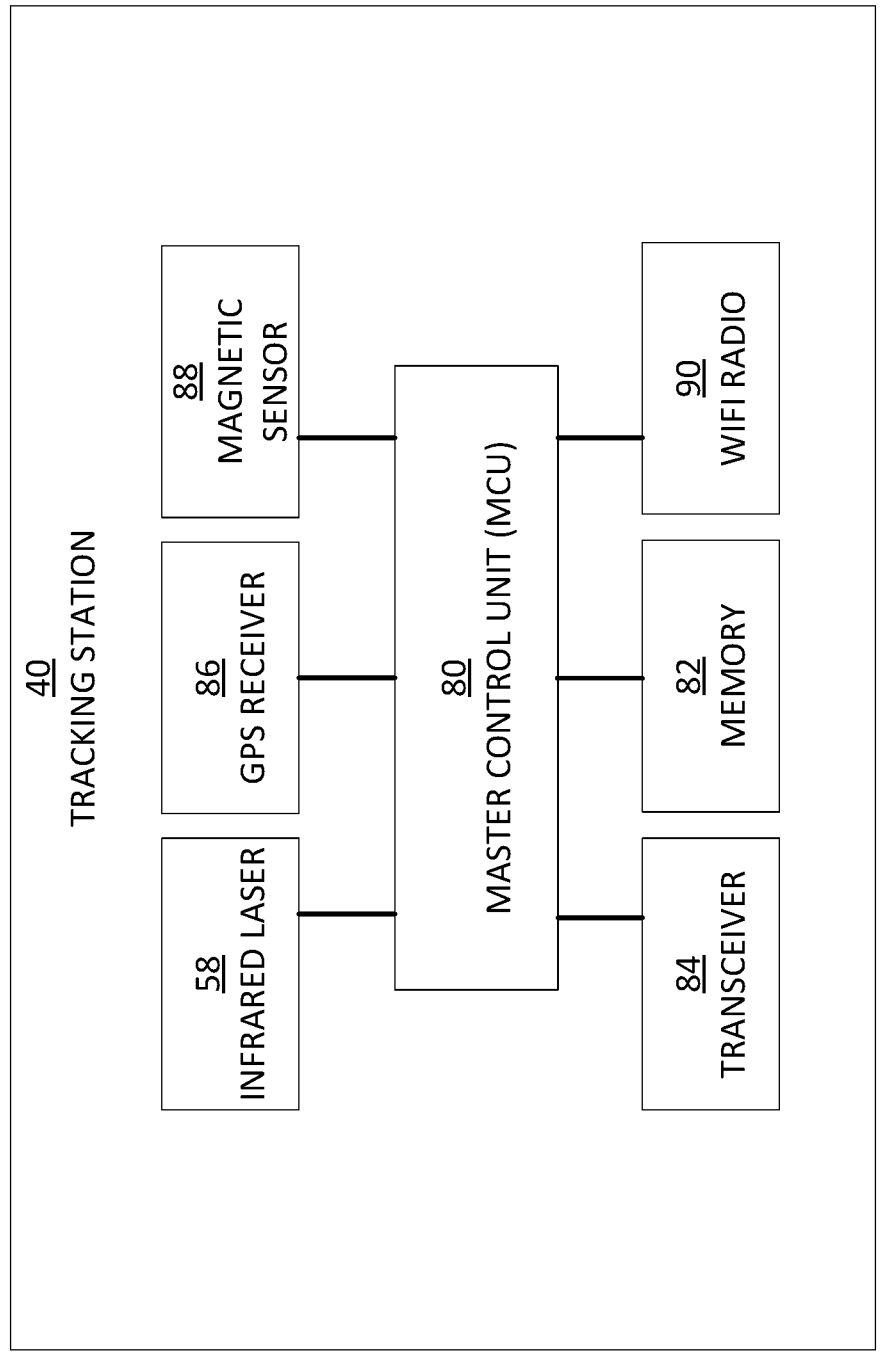
FIG. 9 is a block diagram of the tracking station of FIG. 4.

When the motor 52 is activated, the motor shaft 53 rotates which in turn rotates first gear 54 which is coupled to the motor shaft (the first gear 54 is omitted from FIG. 5 to enable the motor shaft 53 to be visible). The first gear 54 engages a second gear 56, such that the rotation of the first gear 54 rotates the second gear 56. The second gear 56 is directly coupled to the drum 44, such that the rotation of the second gear 56 rotates the drum 44. Any suitable gearing arrangement may be used. Alternatively, any suitable non-geared drive mechanism may be used, such as a belt drive.

Any suitable internal structure may be used to support the internal components of the tracking station 40, and any suitable arrangement/positioning/support of internal components may be used. In the illustrated embodiment, a first support platform 60 supports many of the electronic components, while a second support platform 62 supports the second gear 56 (which in turn supports the drum 44 (although the drum 44 may be supported in other ways)). An IR laser 58 provides the IR laser light source. In one exemplary embodiment of the invention, the IR laser 58 comprises a 40 milliwatt 850 nanometer laser. At least part of the housing 42 should be constructed of a material that is a visible light filter allowing only a specific infrared (IR) wavelength (i.e., that of the IR laser 58) through and blocking most visible light to enable emission of IR laser light from the IR laser 58.

In the illustrated embodiment, the IR laser 58 is mounted to the underside of the second support platform 62 and positioned to emit IR laser light generally vertically upward. The IR laser light projects through an aligned hole 66 in the second support platform 62, through an aligned hole 68 in the second gear 56, and into the drum 44 through an aligned hole 70 in the underside of the drum 44 (as indicated by the arrows in FIGS. 6 and 7). As the IR laser light enters the drum 44 the IR laser light strikes an angled mirror 46 which then redirects the IR laser light generally horizontally down a light channel 48. The mirror 46 should be of the type that properly reflects IR light, such as a silver mirror. At the end of the light channel 48 opposite the mirror is a laser line generator lens 50 which generates a straight, uniform laser line by fanning out the IR laser light in one dimension. Thus, the IR laser light strikes the inner side of the laser line generator lens 50 and a vertical laser line is emitted. The fan angle of the laser line generator lens 50 may vary depending on the specific installation. For example, the fan angle of the laser line generator lens 50 may be between 36.5 and 90 degrees. It may be desirable to have the lens direct the fan line downward instead of directly perpendicular to the axis to ensure most or all of the laser line is covering the predefined two-dimensional (2-D) area instead of the laser emitting toward the sky.

Figure 10:
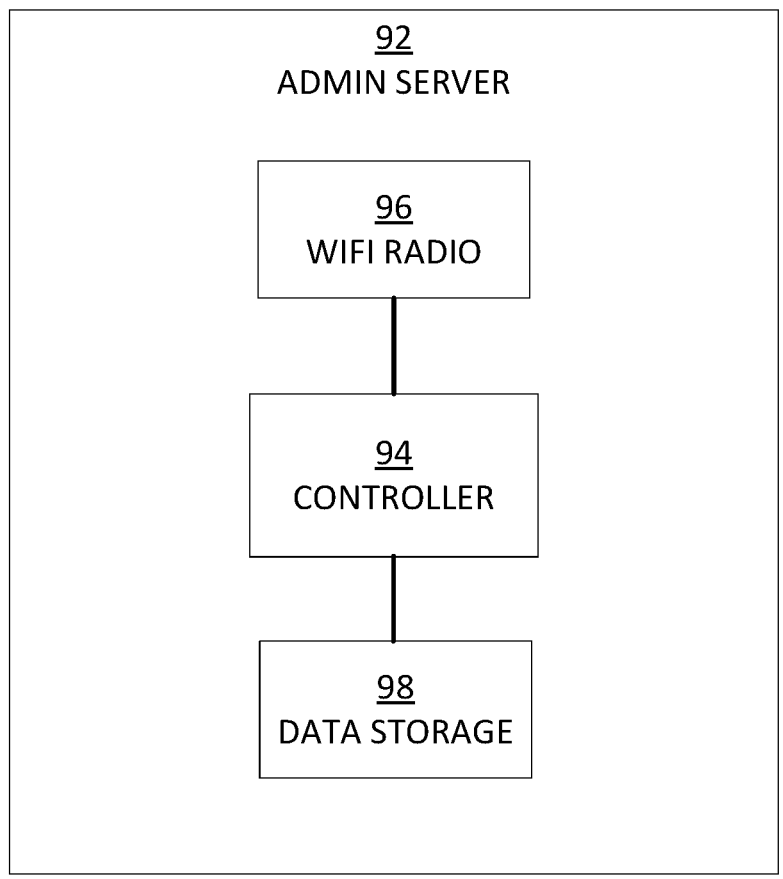
FIG. 10 is a block diagram of an administrative server of an asset tracking system, in accordance with embodiments of the present invention.

FIG. 10 is a block diagram of an administrative server 92, in accordance with embodiments of the present invention. The server 92 comprises a WIFI radio 96 for connecting to the internet through a wireless access point for the purposes of receiving data from a master tracking station, a controller 94, and data storage 98. The controller 94 may comprise a microprocessor, dedicated or general purpose circuitry (such as an application-specific integrated circuit or a field-programmable gate array), a suitably programmed computing device, or any other suitable means for controlling the operation of the server 92.

In operation of one exemplary embodiment of the invention, the tracking stations, tracking tags, and server work together to determine the 2-D locations of all the tracking tags at predetermined intervals (which may be configurable) and/or at predetermined times (which may be configurable) and/or on-demand. For example, the locations of the tracking tags may be determined every ten minutes during business hours (when asset movement is likely to be more frequent) and every sixty minutes after business hours (when asset movement is not expected, and therefore may be used to trigger an alarm). The tracking tags go into a sleep mode to conserve power between tracking events, and wake at each predetermined interval. The wake period of the tracking tags will last for a predetermined period of time (which may be configurable) called a tracking frame. In the tracking frame duration, all tracking stations will coordinate taking turns rotating and transmitting their information.

Each tracking station in turn spins a vertical laser line 360 degrees, with the angle of the emitted laser light determined and encoded on the laser light (or alternatively broadcast via radio frequency) at regular intervals, along with the identifier of the tracking station. The timing of the action of each tracking station may be coordinated such that only one tracking station is emitting/broadcasting at a time. However, such coordination between the tracking stations may not be needed, as the likelihood of simultaneous incident upon the IR receivers is low and can be compensated for with additional station signals. Additionally staggering the starting positions of each station through a coordinated start for each station would help reduce this likelihood as well. In one exemplary embodiment of the invention, the angle of the emitted laser light is determined and encoded on the laser light 3600 times per rotation of the drum (i.e., every tenth of a degree), however any suitable number of times per rotation may be used. In one exemplary embodiment, a quadratic encoder disk is used to determine the current angle of the laser line. The rotational position of the drum when the laser line is pointing at magnetic north may be predetermined (such as during setup), or may be periodically or continuously determined via a compass to ensure a calibrated rotation from magnetic north. As an alternative to using a quadratic encoder disk, reflective tape on the rotating drum and a sensor may be used to determine the rotational speed of the drum (e.g., by determining the time interval between each time the reflective tape and sensor pass each other) and thereby determine the current angle of the laser line. In such an alternative embodiment, the rotation speed and time passed since the laser line pointed north is used to calculate the rotational degrees past north and to thereby detect where the laser line is (however, any other suitable mechanism or method of determining the angle of the emitted laser light may be used).

Each tracking station reports over WiFi to an internet-connected server its current GPS location and orientation to magnetic north (as this information is unlikely to change, reporting of this information may not necessarily be performed during every tracking frame) (alternatively, any suitable communication mode may be used between the tracking stations and the server). Because the tracking stations are typically in fixed locations once installed, the GPS receivers may be omitted from the tracking stations in alternative embodiments of the invention to reduce cost. During installation, the location of each tracking station may be determined (such as by use of a handheld GPS receiver by the installer) and then stored (either in each respective tracking station or, more likely, in the server) for use in calculating the tracking tag locations as described below.

At least one tracking station requires internet access over cellular or WiFi and will/can operate as an internet gateway for all other tracking stations as well. Each tracking station may be able to transmit data (such as via a 915 MHz radio) in a network eventually passing the data to the internet connected station. All tracking stations will likely be built with the same internet gateway capability and thus can also be available as a redundant backup, but typically only one will be configured to operate as the internet gateway in order to reduce the impact of the network client connections for the customer's wireless network or to reduce costs for a cellular connection.

Once each tracking tag wakes, it watches for a spike in infrared light detected from the laser sweep hitting the IR sensors. Because of the potential distance between the tracking stations and the tracking tags and because of the potential impact of direct sunlight, each tracking tag will typically comprise a pass filter to filter out DC light and allow only pulsed light and an amplifier to boost the signal. Once a laser sweep is detected by the tracking tag 20 via the photodiodes 22, the processor 24 decodes the identifier of the tracking station that is its source and the angle, both of which may be encoded on the laser light. Optionally, the angle from the tracking station could be transmitted over radio frequency with the tracking tag using the laser sweep as an indicator to turn on the radio to receive the angle transmission broadcast. The angle to magnetic north received from the tracking station in relation to the tracking station's identifier and time stamp of receipt is recorded in memory on the tracking tag. The tracking station information received from each tracking station is recorded in memory on the tracking tag as an array of data.

Once the tracking frame duration has completed, the tracking packet containing angles from multiple tracking stations will be transmitted (such as via a 915 MHz radio) from the tracking tag to a master tracking station set to receive these packets from all of the tags. Once received, the master tracking station will operate as a gateway to forward the packets of angles along with the tag ID to an internet connected server over a WiFi connection. Alternatively, the tracking stations may transmit the tracking packet directly to the server. Alternatively, any suitable communication mode may be used between the tracking stations and the master tracking station, and between the master tracking station and the server, or between the tracking tags and the server (if such communication occurs).

Upon receiving the packet of angles from each tracking tag (typically via a master tracking station), the internet connected server will determine the location of each tag using the known latitude and longitude of the tracking station positions and the detected angles therefrom. The location (latitude and longitude) of each tracking tag may be provided to one or more users in any suitable format, such as by displaying on a map of the tracked area or converting the latitude and longitude into a more user-friendly reference (for example, row and space number for a parking lot). Alternatively, the location of each tag may be calculated in the master tracking station and the locations transmitted from the master tracking station to the server where the location information may be accessible by users (such as via displays and/or reports).

The system may compare tracking tag locations in successive scans to identify movement of each asset (i.e., whether the asset has been moved, added, or removed). The system may determine (such as by cross-reference to a record of expected location or expected movement) if such movement was expected and if not, issue an alert.

It is within the capability of one of ordinary skill in the art to calculate an accurate position of the tags when provided multiple (three or more) angles to a base station with known coordinates (i.e., calculating the common point of intersecting vectors). One example of software instructions for such a calculation is provided in the provisional patent application to which the present application claims priority.

Figure 11:
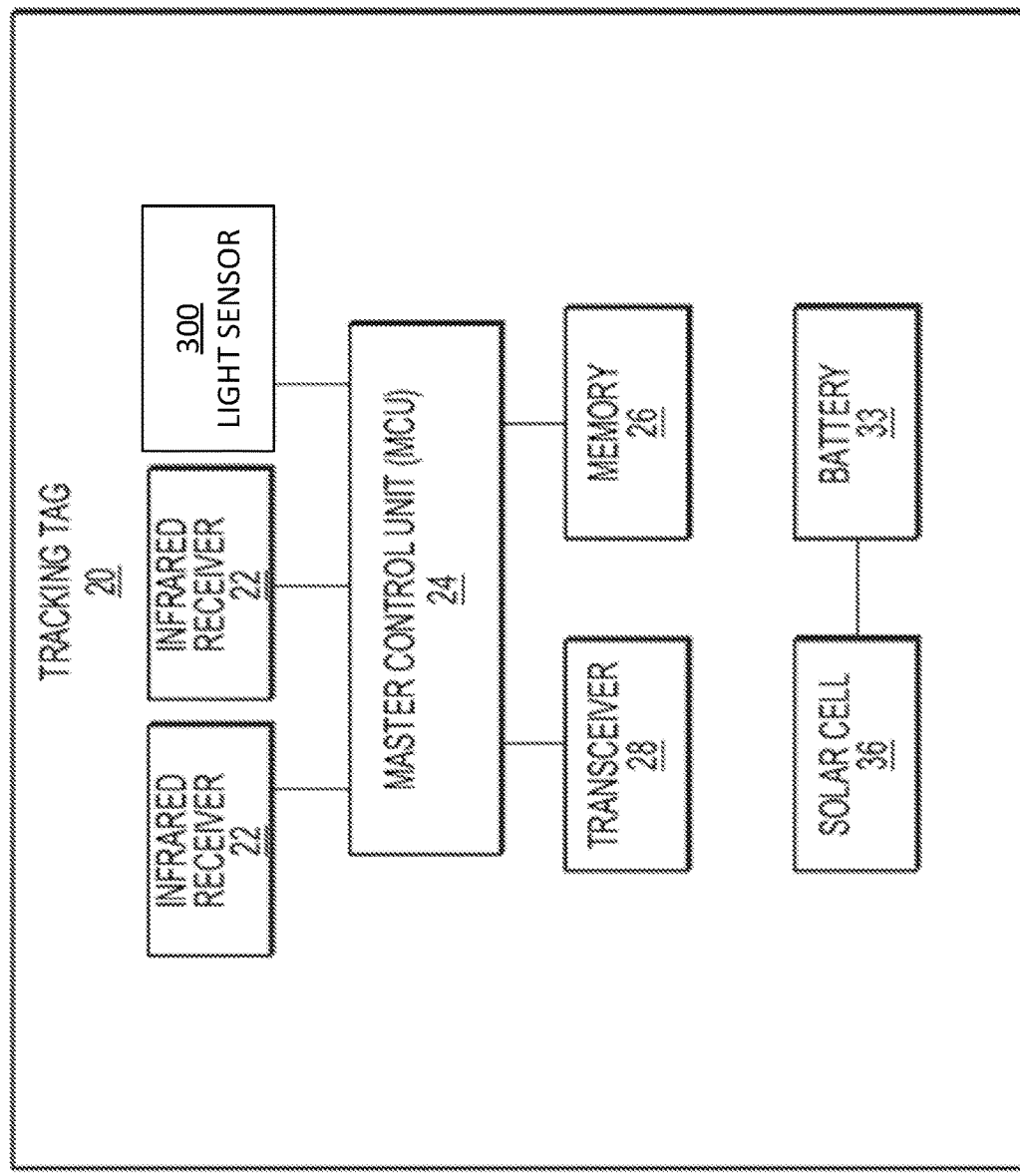
FIG. 11 is a block diagram of one embodiment of a tracking tag.

FIG. 11 illustrates one embodiment a track tag 20, similar to the tracking tag 20 described above, including as referenced in FIG. 3. In this embodiment, the tracking tag 20 includes a light sensor 300 and the master control unit 24 includes processing operations for performing computing steps described herein. The light sensor 300 may be any suitable type of sensor capable of detecting light, such as light emitted from a tracking station.

The tracking tag 20 can operate consistent with the embodiments described above. In further embodiments, the tracking tag can additionally determine its angle to the tracking stations by detecting tracking station laser output in response to a wake cycle and a timing reference, which can be based on a synchronized light flash described herein.

Figure 12:
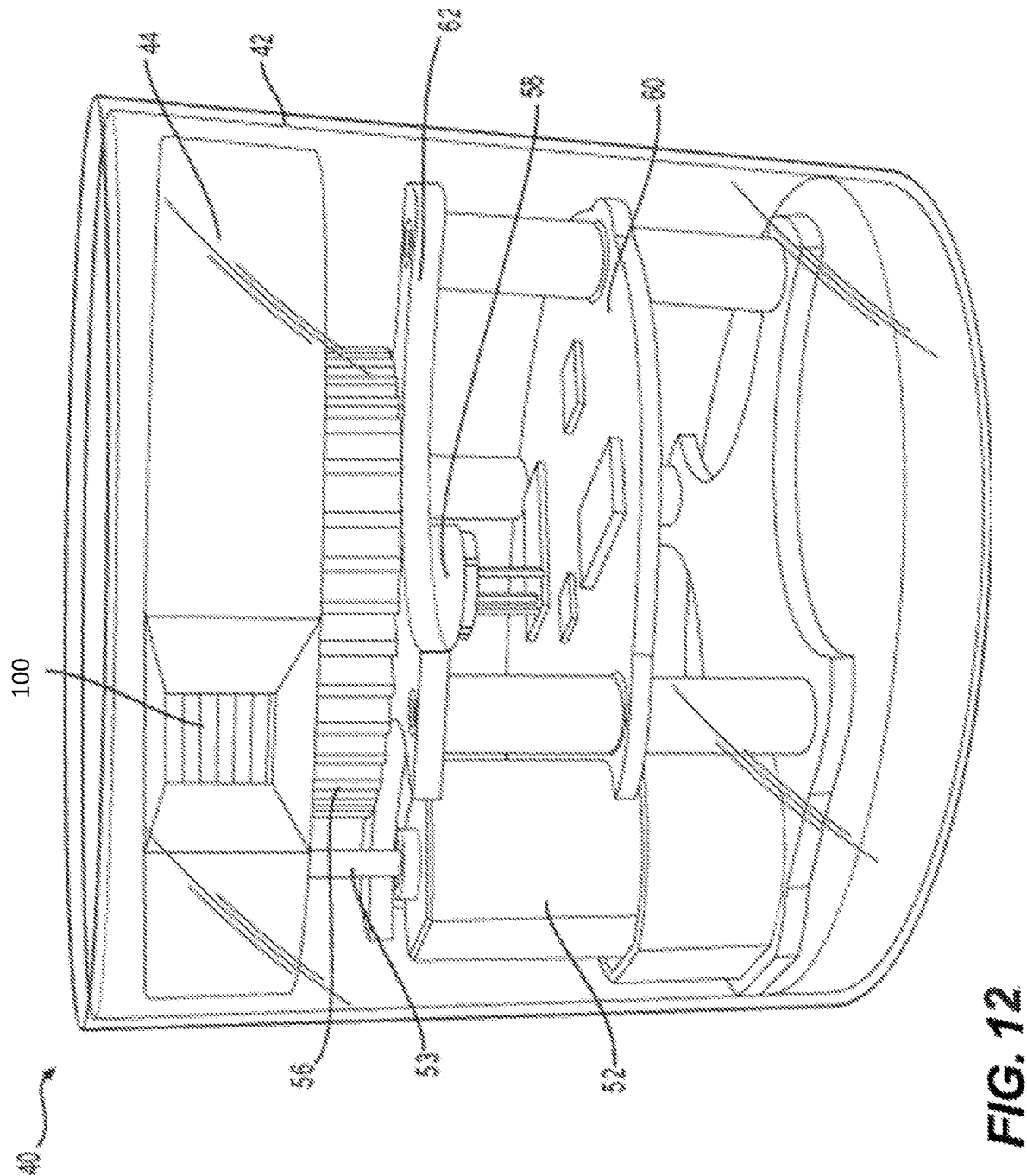
FIG. 12 is a perspective view of one embodiment of a tracking station.

FIG. 12 illustrates one embodiment of a tracking station 40. The station 40 is similar to the station 40 of FIG. 5, in this embodiment including a light emitter 100 either in place of or in combination with the IR transmitter noted in FIG. 5. Moreover, the tracking station 40 includes processing routines and executable instructions for performing emitting operations consistent with the embodiments noted herein.

In this embodiment, the determination of position information can operate concurrent with the above-described embodiments or can operate in lieu thereof. This embodiment provides for a tracking system using time difference of arrival.

The whole system has a sleep and wake cycle governed by synchronized clocks on the tracking stations. Each tracking station synchronizes their internal clocks using GPS timestamp data and well known time synchronization techniques.

After the synchronization procedure is complete the tracking stations share a common time frame for when to awake and perform the wake procedure. In one embodiment, tracking tags are kept in sync with the tracking stations when they report their tracking data and receive a timestamp in the response from the base station. This embodiment operates based on the tracking tag not having its own GPS receiver, including reducing processing overhead and power consumption at the tag.

As for the position determination process, the tracking stations begin a wake sequence. Each of the base stations awake and allows for a buffer of time to pass to ensure all tracking tags have fully awakened and powered on their photoreceptors. After this duration has passed, ensuring all the tracking tags are active, each base station emits a blast of light is emitted in all directions. This blast of light informs the tracking devices within range the start of the tracking cycle. The tracking devices including processing instructions to recognize the blast of light and begin the tracking cycle.

The tracking tags awake at a known time for the wake cycle. The devices first await a sync incident to be detected on the photoreceptor, such as a photoreceptor 300 of FIG. 11. When this light event is detected, the tracking device starts timers for each of the tracking station sweeps to be performed. The start times of each sweep are calculated based upon a number of known ticks of the internal clock since the sync IR blast was first detected for this wake cycle. The duration of each tracking station sweep can be configurable due to variable speeds and the number of stations, thus these settings are configured on the tag and stored in local memory.

Each tracking station takes a turn spinning its laser line around all 360 degrees. It spins at a predetermined speed intended to allow a tracking tag to detect the angle by calculating the timestamp of the incident subtracted by the start timestamp for that specific cycle. The delta of time between the two combined with the known rotation speed produces the angle at time of incident. Each cycle relates to a specific tracking station, for instance if there are 5 tracking stations, each of them will take a turn performing the 360 degree sweep.

The identifier of the tracking station is determined by the timestamp of the incident and the known configuration of the wake cycle. For instance, if 10 tracking stations are present, each will spin in sequence for a predetermined span of time based upon the rotation speed and number of configured rotations. When the tracking station begins its spin, the laser will not be powered on until the laser line lens position corresponds to the magnetic true north 0 degree shared reference.

In one exemplary embodiment, the system can include ten tracking stations. In the spin sequence, each tracking station rotates 3 times. Each full 360 degree rotation takes 0.25 rotations per second. From here, the total time spent performing a tracking cycle would be 120 second as calculated based on 10 tracking stations times 3 rotations at 0.25 rotations per second. Or in alternative terms, a 0.25 rotations per second means the tracking station does a full rotation in four seconds. Three rotations would then take 12 seconds. For 10 tracking stations, the total time is 120 seconds.

For detecting the tracking station, the tracking tags will start internal clocks to calculate which tracking station in sequence (1st, 2nd, 3rd, etc) is the cause of the photoreceptor incident if one is detected. This will provide a tracking station identifier for the incident.

For detecting the angle, the tracking tag starts a clock from the starting point of each tracking station spin cycle. If an incident is detected in that span of time, the amount of time passed since the start of the spin combined with the rotation speed corresponds to an angle. This process is repeated for each spin of the configured spin count per spin cycle. The average angle from each detection is taken as the final angle.

By way of example, if a start of spin cycle for tracking station 3 is recorded on the tracking tag as 10055 ms. An incident is detected on the photoreceptor at 12348 ms. The difference between the two clock readings is a duration of 2293 ms. Based upon the above example configuration of 0.25 rotations per second, the 2293 ms duration corresponds to an angle from true north of 206.37 degrees based upon the following: 360 deg/(1000 ms/0.25 rot per sec)=0.09 degrees per ms.

In another example, if there are 5 base stations, they will each take a turn performing a sweep of 360 degrees. Based on the commonly shared rotation speed the sweeps, windows of time can be predetermined as cycle identifiers or identifiers of the base stations. For instance if the rotation speed is 5 seconds for 5 devices and the base stations will spin in order by their device id (1 through 5), then the total spin time will be 5×5=25 seconds where each 5 seconds of that total 25 seconds can be used to determine the base station id that emitted the light sweep. If a laser light incident was detected by the photoreceptor of a tracking tag at 17.35 seconds since the sync IR blast of light, then two things are known: the base station ID that emitted that light is floor (17.3/5)=3; and the angle calculated is ((17.3% 5)/5)*360) =165.6 deg.

Figure 13:
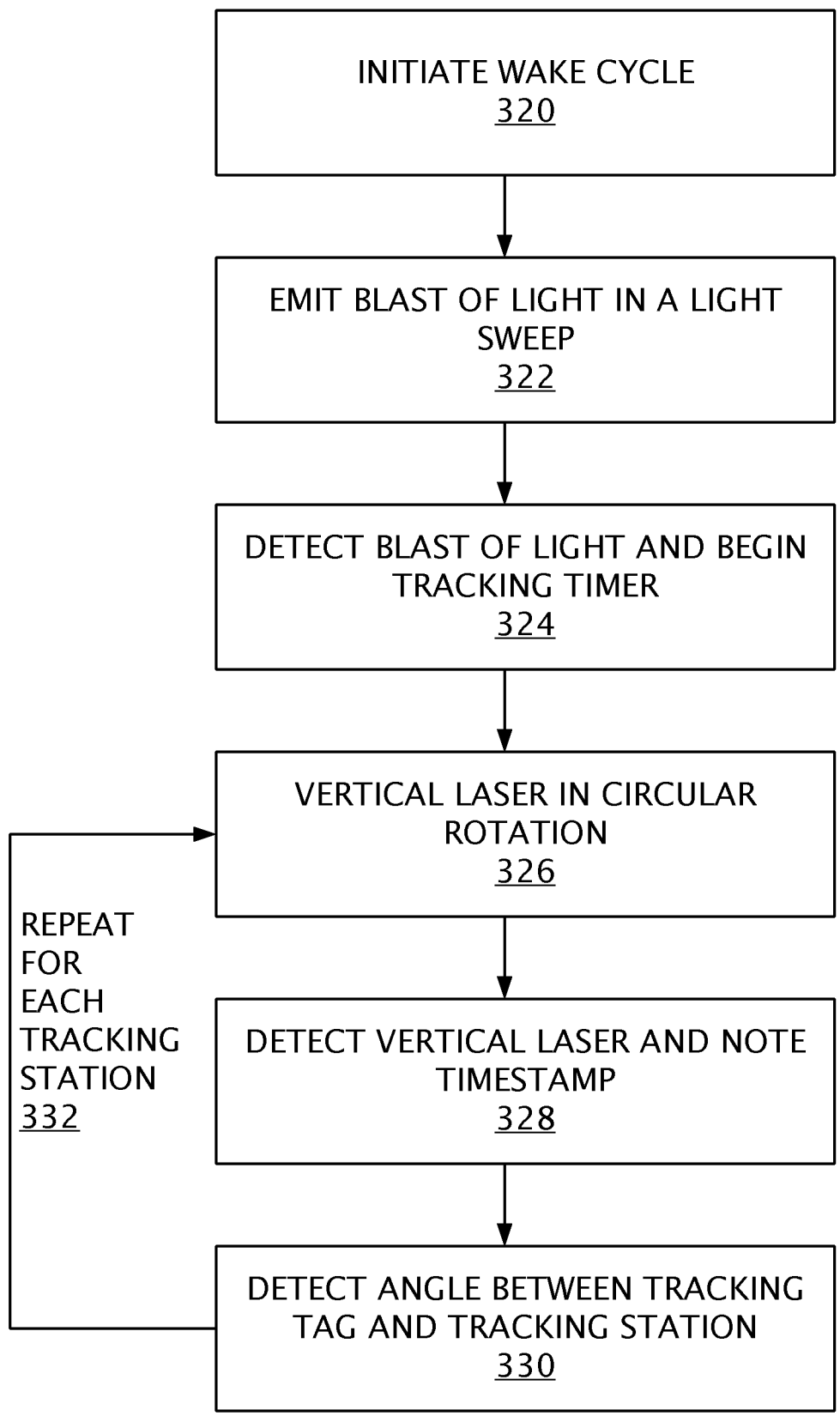
FIG. 13 is a flowchart of the steps of one embodiment.

FIG. 13 a flowchart of the method steps of one embodiment of determining position information. The method may be performed using the tracking stations and tracking tags described herein.

Step 320 is initiating the wake cycle. As noted above, as this wakes up the tracking stations, the waking cycle include a pause to ensure the tracking tags are awake and active.

Step 322 is emitting a blast of light in a light sweep. This can be performed by the tracking modules, such as tracking module 40 of FIG. 12 emitting the light via the emitter 100. In one embodiment, all tracking modules 40 can synchronously emit the blast of light in the light sweep. In another embodiment, one or more of the tracking modules can be selected.

Step 324 is performed by the tracking tags, detecting the blast of light and begin a tracking timer. Processing operations can be performed internally within the tracking tags to begin the timer.

For each of the tracking stations, in a predefined sequence, the method includes steps 326-330. Step 326 is vertical laser emission in circular rotation. This is similar to the laser emission as noted above. The tracking station emits the laser in 360 degrees at the defined rotational speed.

Step 328 is detecting vertical laser by the tracking tag and noting the timestamp. This timestamp, when references to the master timing sequence for the tracking stations, allows for detecting the angle between the tracking tag and the tracking station, step 330.

In step 332, these operations are repeated for each of the tracking stations. For example, as noted above, the system may include 10 tracking stations and the tracking modules can have knowledge of the sequencing of tracking station emissions. For each of the tracking stations, the tracking modules can then calculate its corresponding angles.

Having knowledge of the angles between the tracking stations and the tracking modules, the method and system can then use mapping and geometrical operations to determine positions of the tracking modules within the 2-D area.

The present invention may be a system, a device, a method, and/or a computer program product at any possible technical detail level of integration. For example, a device of embodiments of the invention may comprise a tracking station or a tracking tag as described above and a computer program product for controlling the operation of the tracking station and/or tracking tag. As another example, a system of embodiments of the invention may comprise an asset tracking system having a plurality of tracking stations and a plurality of tracking tags as described above and a computer program product for controlling the operation of such as system. As another example, embodiments of the invention may comprise a method for controlling the operation of an asset tracking system as describe above, or individual tracking stations and/or tracking tags as described above. As another example, embodiments of the invention may comprise a computer program product for controlling the operation of an asset tracking system as describe above, or individual tracking stations and/or tracking tags as described above. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams (if any) in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining positioning information, the method comprising:
    for each of a plurality of tracking stations, initiating a wake cycle at a first time including pausing for a first time period and after the first time period emitting a blast of light in a light sweep;
    in one or more tracking tags, waking at the first time and activating a photoreceptor embedded therein;
    the one or more tracking tags, detecting the blast of light and initiating a tracking timer therein;
    for each of the plurality of tracking stations, emitting a vertical laser in a circular rotation at a rotational speed; and
    in the one or more tracking tags, for each of the plurality of tracking stations, detecting the vertical laser at a timestamp and detecting an angle between the tracking tag and each of the plurality of tracking stations based on the timestamp and tracking timer.

2. The method of claim 1, where each of the one or tracking tags is attached to a corresponding asset whose location in a predefined 2-D area is determined based on the angle as determined relative to each of the plurality tracking stations.

3. The method of claim 1, wherein the detecting the angle is based on subtracting a start time of the tracking timer from the timestamp.

4. The method of claim 3, wherein the detecting the angle is further based on the rotational speed of the tracking station emitting the vertical laser.

5. The method of claim 1 further comprising:
    determining each tracking station of the plurality tracking stations based on a time of the detecting the blast of light and a pre-existing configuration of the wake cycle.

6. The method of claim 5, wherein the pre-existing configuration of the wake cycle includes a defined sequence for each of the plurality of tracking stations to emit the blast of light in the light sweep.

7. The method of claim 6, wherein in the defined sequence only one of the plurality of tracking stations emits the blast of light one at a time.

8. The method of claim 1, wherein each of the plurality of tracking stations selectively sweeps the vertical laser line 360 degrees about a central axis of the tracking station.

9. A system for determining positioning information, the system comprising:
    a plurality of tracking stations, wherein each of the plurality of tracking stations initiate a wake cycle at a first time including pausing for a first time period and after the first time period emitting a blast of light in a light sweep;
    one or more tracking tags, wherein each of the one or more tracking tags wakes at the first time and activates a photoreceptor embedded therein, thereupon detecting the blast of light and initiating a tracking timer therein;
    each of the plurality of tracking stations emit a vertical laser in a circular rotation at a rotational speed; and
    the one or more tracking tags, for each of the plurality of tracking stations, detects the vertical laser at a timestamp, detects an angle between the tracking tag and each of the plurality of tracking stations based on the timestamp and tracking timer.

10. The system of claim 9, wherein each of the one or more tracking tags is attachable to an asset whose location in a predefined 2-D area is to be selectively identified based on the angle as determined relative to each of the plurality tracking stations.

11. The system of claim 9, wherein the one or more tracking tags detecting the angle is based on subtracting a start time of the tracking timer from the timestamp.

12. The system of claim 11, wherein the detecting the angle is further based on the rotational speed of the tracking station emitting the vertical laser.

13. The system of claim 9, wherein the one or more tracking tags determining each tracking station of the plurality tracking stations is based on a time of the detecting the blast of light and a pre-existing configuration of the wake cycle.

14. The system of claim 13 wherein the pre-existing configuration of the wake cycle includes a defined sequence for each of the plurality of tracking stations to emit the blast of light in the light sweep.

15. The system of claim 14, wherein in the defined sequence only one of the plurality of tracking stations emits the blast of light at a time.

16. The system of claim 9, wherein each tracking station has a different known location in 2-D space, wherein each tracking station is configured to selectively emit a vertical laser line upon which is embedded an identifier unique to the corresponding tracking station, wherein each tracking station is configured to selectively sweep its laser line about a central axis of the corresponding tracking station such that each tracking station's laser line sweeps across at least a portion of the predefined 2-D area, wherein each tracking station is configured to selectively transmit a current angle of its laser line about its central axis as its laser line sweeps about its central axis.

17. The system of claim 16, wherein each of the one or more tracking tags is attachable to an asset whose location in the predefined 2-D area is to be selectively identified, wherein each tracking tag is configured to detect a laser line from at least three tracking stations within a line of sight of the tracking tag, wherein each tracking tag is configured to decode the unique tracking station identifier from each detected laser line, wherein each tracking tag is configured to receive the current angle from the tracking station corresponding to the detected laser line.

18. The system of claim 9, wherein each tracking station is configured to selectively sweep its vertical laser 360 degrees about its central axis.

19. The system of claim 9 further comprising:
a computing device in communication with one or more of the tracking stations and/or one or more of the tracking tags.

20. The system of claim 19, wherein each of the one or more tracking tags selectively transmits a stored unique tracking station identifier from each detected laser line and corresponding detect angle of the laser line to the computing device;
wherein the computing device is configured to calculate a current location of each of the one or more tracking tags based on the received unique tracking station identifier and angle of the laser line from each tracking tag and based on a known location of each of the plurality of tracking stations.

\* \* \* \* \*